United States Patent
Hashimoto et al.

(10) Patent No.: US 10,458,493 B2
(45) Date of Patent: Oct. 29, 2019

(54) CONTROL DEVICE AND CONTROL METHOD

(71) Applicant: FUJITSU TEN LIMITED, Kobe-shi, Hyogo (JP)

(72) Inventors: Sumiaki Hashimoto, Kobe (JP); Natsuki Yokoyama, Kobe (JP)

(73) Assignee: FUJITSU TEN Limited, Kobe (JP)

( * ) Notice: Subject to any disclaimer, the term of this patent is extended or adjusted under 35 U.S.C. 154(b) by 206 days.

(21) Appl. No.: 15/627,865

(22) Filed: Jun. 20, 2017

(65) Prior Publication Data

US 2018/0087588 A1    Mar. 29, 2018

(30) Foreign Application Priority Data

Sep. 23, 2016   (JP) ................. 2016-185917

(51) Int. Cl.
| | |
|---|---|
| *F02D 41/24* | (2006.01) |
| *F02D 41/00* | (2006.01) |
| *F16D 48/06* | (2006.01) |
| *F15B 21/08* | (2006.01) |
| *F16H 61/02* | (2006.01) |
| *G05D 16/20* | (2006.01) |
| *F02D 41/20* | (2006.01) |
| *F02D 41/14* | (2006.01) |

(52) U.S. Cl.
CPC ....... *F16D 48/066* (2013.01); *F02D 41/0077* (2013.01); *F02D 41/20* (2013.01); *F02D 41/2464* (2013.01); *F15B 21/087* (2013.01); *F16H 61/0251* (2013.01); *G05D 16/2093* (2013.01); *F02D 41/0065* (2013.01); *F02D 2041/1409* (2013.01); *F02D 2041/2031* (2013.01); *F02D 2041/2051* (2013.01); *F02D 2041/2058* (2013.01); *F02D 2250/16* (2013.01); *F16D 2500/70406* (2013.01); *F16D 2500/70418* (2013.01); *F16H 2061/0258* (2013.01); *Y02T 10/47* (2013.01)

(58) Field of Classification Search
CPC ...... F02D 41/00; F02D 41/0077; F02D 41/20; F02D 41/24; F02D 41/2464; F15B 21/087; F16D 61/02; F16H 61/0251; G05D 16/20; G05D 16/2093
USPC ........... 123/478–481, 568.18–568.2, 568.21; 701/106–108
See application file for complete search history.

(56) References Cited

U.S. PATENT DOCUMENTS

| | | | | |
|---|---|---|---|---|
| 5,715,797 A | * | 2/1998 | Minagawa | .......... F02D 41/3082 123/478 |
| 7,614,384 B2 | * | 11/2009 | Livshiz | ................. F02D 11/105 123/399 |

(Continued)

FOREIGN PATENT DOCUMENTS

JP        2010-216648 A      9/2010

*Primary Examiner* — John Kwon
*Assistant Examiner* — Johnny H Hoang
(74) *Attorney, Agent, or Firm* — Oliff PLC

(57) ABSTRACT

A control device according to an embodiment includes a storage, a determining unit, and a driving unit. The storage stores therein information on a hysteresis area of an actuator. The determining unit determines, based on a control mode, a target current value according to the hysteresis area whose information is stored in the storage. The driving unit supplies a driving current according to the target current value determined by the determining unit to the actuator.

6 Claims, 9 Drawing Sheets

(56) References Cited

U.S. PATENT DOCUMENTS

| | | | | |
|---|---|---|---|---|
| 8,473,179 | B2* | 6/2013 | Whitney | F02D 13/0207 |
| | | | | 701/102 |
| 8,505,872 | B2* | 8/2013 | Kawamura | F16K 31/04 |
| | | | | 123/568.19 |
| 2001/0029935 | A1* | 10/2001 | Cook | F02D 21/08 |
| | | | | 123/568.27 |
| 2009/0229583 | A1* | 9/2009 | Kotooka | F02D 21/08 |
| | | | | 123/568.18 |
| 2014/0174413 | A1* | 6/2014 | Huang | F02B 47/08 |
| | | | | 123/568.18 |
| 2014/0278001 | A1* | 9/2014 | Miller | F02D 41/0097 |
| | | | | 701/103 |
| 2015/0127242 | A1* | 5/2015 | Iizuka | F16H 61/02 |
| | | | | 701/110 |
| 2016/0237932 | A1* | 8/2016 | Long | F02D 41/045 |
| 2017/0122268 | A1* | 5/2017 | Hashimoto | F02M 26/53 |

* cited by examiner

| TARGET LIFTING AMOUNT | HYSTERESIS AREA H | | |
|---|---|---|---|
| | UPPER LIMIT AH | LOWER LIMIT AL | INTERMEDIATE VALUE AM |
| Px1* | AH1 | AL1 | AM1 |
| Px2* | AH2 | AL2 | AM2 |
| Px3* | AH3 | AL3 | AM3 |
| Px4* | AH4 | AL4 | AM4 |
| ⋮ | ⋮ | ⋮ | ⋮ |
| Pxn* | AHn | ALn | AMn |

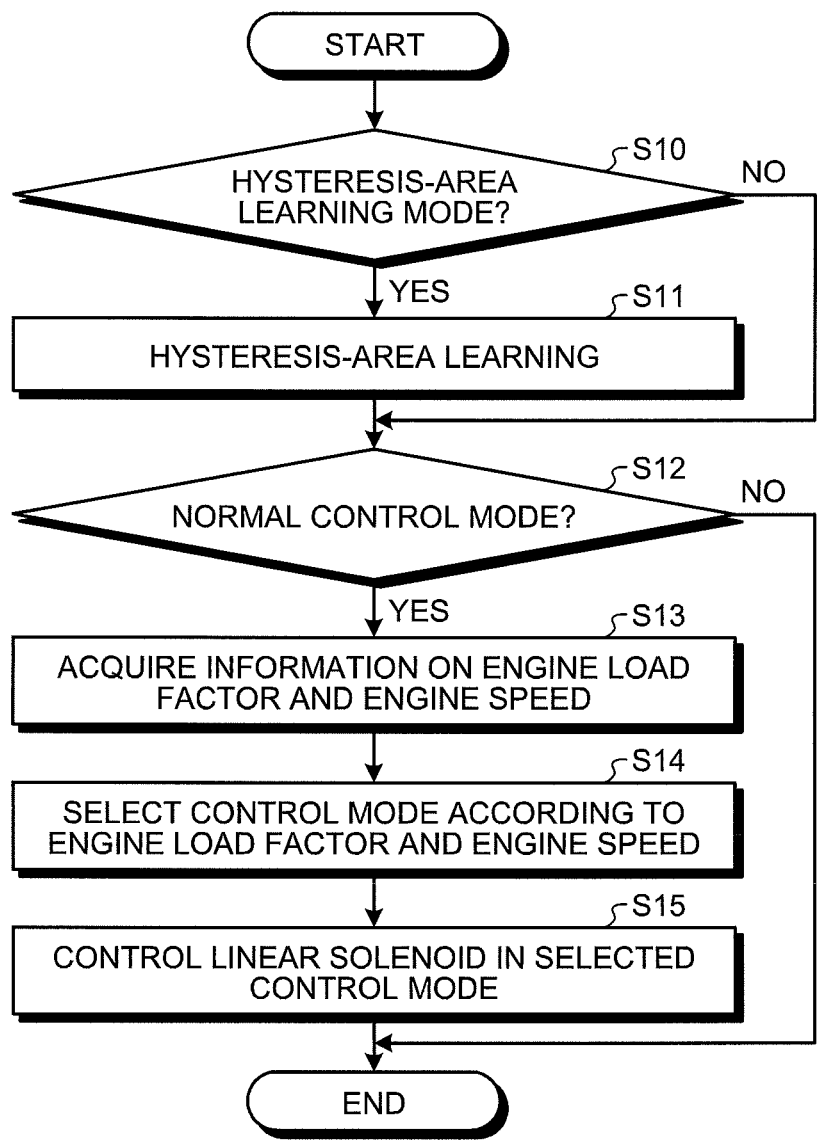

CONTROL DEVICE AND CONTROL METHOD

CROSS-REFERENCE TO RELATED APPLICATION

This application is based upon and claims the benefit of priority of the prior Japanese Patent Application No. 2016-185917, filed on Sep. 23, 2016, the entire contents of which are incorporated herein by reference.

FIELD

The embodiment discussed herein is directed to a control device and a control method.

BACKGROUND

Conventionally, there has been known a control device that controls an actuator such as a linear solenoid. The control device supplies a driving current corresponding to a target driving amount of the actuator to the actuator in order to control to harmonize a driving amount of the actuator with the target driving amount.

An actuator such as a linear solenoid has a hysteresis area in which a driving amount is not changed even when a driving current is changed. Therefore, there has been proposed a control device for an actuator that performs correction for the next target driving amount in consideration of the hysteresis area (see Japanese Laid-open Patent Publication No. 2010-216648, for example).

With regard to a control device for an actuator, it is desirable to further improve control performance for the actuator in consideration of a hysteresis area.

SUMMARY

According to an aspect of an embodiment, a control device includes a storage, a determining unit, and a driving unit. The storage stores therein information on a hysteresis area of an actuator. The determining unit determines, based on a control mode, a target current value according to the hysteresis area whose information is stored in the storage. The driving unit supplies a driving current according to the target current value determined by the determining unit to the actuator.

BRIEF DESCRIPTION OF DRAWINGS

A more complete appreciation of the present application and many of the attendant advantages thereof will be readily obtained as the same becomes better understood by reference to the following detailed description when considered in connection with the accompanying drawings, wherein:

FIG. 15 is a flowchart illustrating an example of a processing procedure that is executed by a controller.

DESCRIPTION OF EMBODIMENT

Hereinafter, an exemplary embodiment of a control device and a control method disclosed in the present application will be explained in detail with reference to the accompanying drawings. In addition, the embodiment disclosed below is not intended to limit the present invention.

1. Control Method of Actuator

Figure 1A:
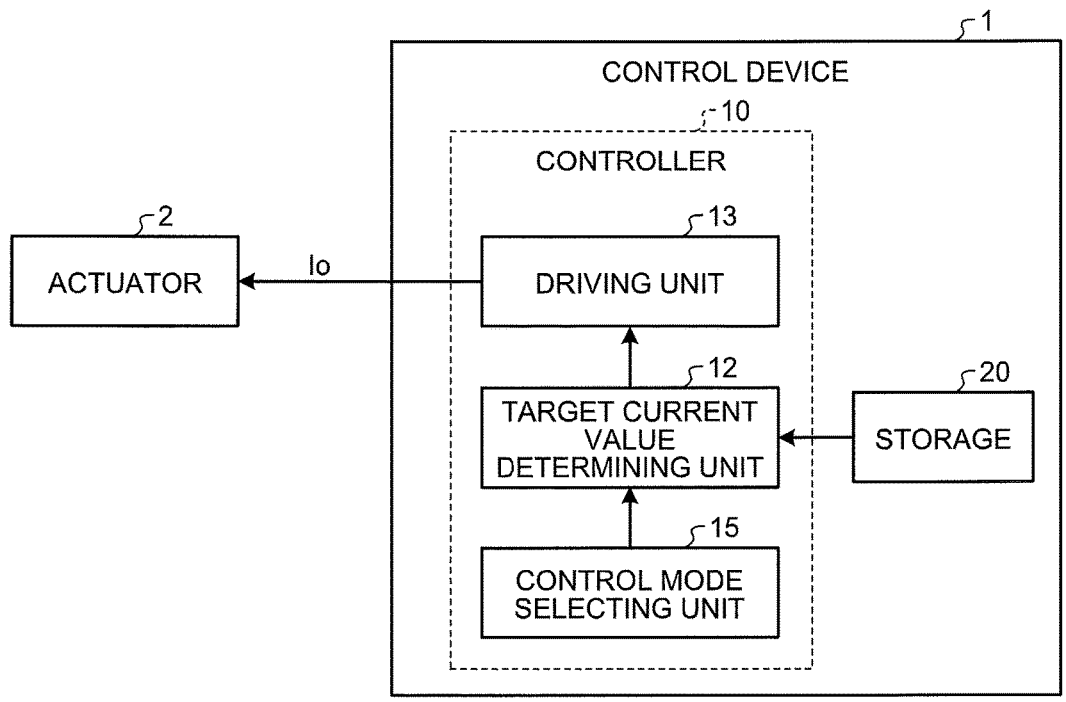
FIG. 1A is a diagram illustrating a configuration example of a control device for an actuator according to an embodiment.

A control method of an actuator according to an embodiment will be explained with reference to FIGS. 1A and 1B. FIG. 1A is a diagram illustrating a configuration example of a control device 1 for an actuator 2 according to the embodiment.

As illustrated in FIG. 1A, the control device 1 according to the embodiment supplies a driving current Io to the actuator 2 to drive the actuator 2. The actuator 2 is an actuator that has hysteresis characteristics. For example, the actuator 2 is a linear solenoid, a rotary solenoid, a servo motor, etc.

The control device 1 includes a controller 10 and a storage 20. The storage 20 stores therein information on a hysteresis area H of the actuator 2 for each target lifting amount Px*. The controller 10 determines a target current value Io* on the basis of the information on the hysteresis area H, and supplies the driving current Io corresponding to the target current value Io* to the actuator 2.

The controller 10 includes a target current value determining unit 12, a driving unit 13, and a control mode selecting unit 15 (example of mode selecting unit). The target current value determining unit 12 determines the target current value Io* so that a driving amount (activation point) P of the actuator 2 is identical with a target driving amount (target activation point) P* that is a target value of the driving amount P. The driving unit 13 supplies the driving current Io corresponding to the target current value Io* to the actuator 2. The control mode selecting unit 15 selects a control mode in accordance with the configuration state of the actuator 2, for example.

Herein, when the driving amount P of the actuator 2 arrives at the target driving amount P*, the target current value determining unit 12 determines the target current value Io* corresponding to the hysteresis area H whose information is stored in the storage 20, on the basis of the control mode selected by the control mode selecting unit 15.

Figure 1B:
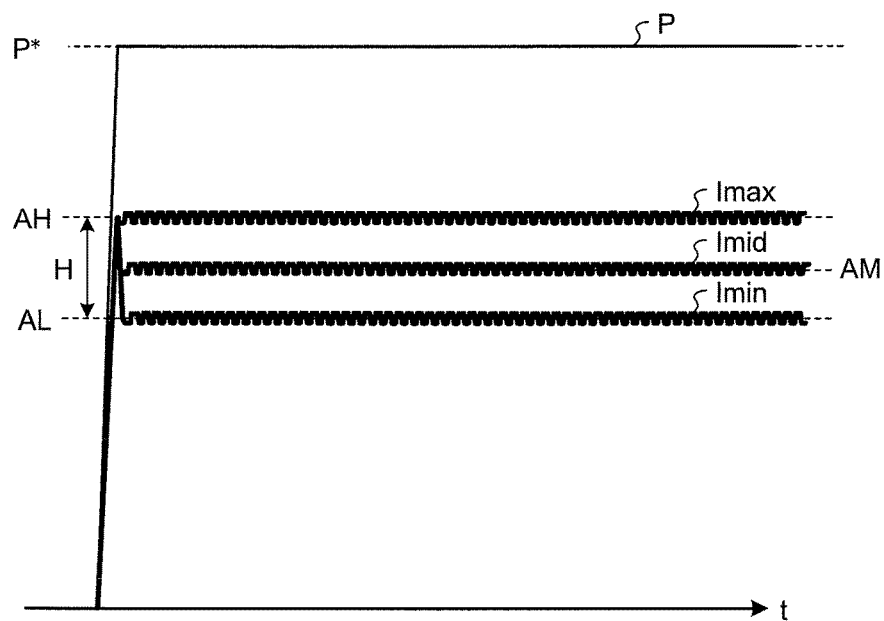
FIG. 1B is a diagram explaining a control method of a driving current in a hysteresis area of the actuator according to the embodiment.

FIG. 1B is a diagram explaining a control method of the driving current Io in the hysteresis area H and a diagram illustrating states of the driving current Io in first to third control modes. Moreover, the hysteresis area H is an area in which the driving amount P of the actuator 2 is not substantially changed even if the driving current Io is changed.

When the control mode selected by the control mode selecting unit 15 is the first control mode, the target current value determining unit 12 determines the target current value Io* such that the driving current Io is set to an intermediate value AM of the hysteresis area H. As a result, the driving current Io to be supplied to the actuator 2 can be stably maintained within the hysteresis area H as "Imid" illustrated in FIG. 1B, and thus the driving amount P of the actuator 2 can be stably maintained.

When the control mode selected by the control mode selecting unit 15 is the second control mode, the target current value determining unit 12 determines the target current value Io* such that the driving current Io is set to a lower limit AL of the hysteresis area H. As a result, the size of the driving current Io can be suppressed at the minimum ("Imin" illustrated in FIG. 1B), and thus power consumption can be reduced until the target driving amount P* is next changed.

When the control mode selected by the control mode selecting unit 15 is the third control mode, the target current value determining unit 12 determines the target current value Io* such that the driving current Io is set to the lower limit AL or an upper limit AH of the hysteresis area H, on the basis of a variation direction (moving direction) of the target driving amount P* to be next predicted.

Herein, it is assumed that the driving amount P of the actuator 2 increases more (moves to positive direction) as the driving current Io is larger. In this case, when it is predicted that the next target driving amount P* increases, the target current value determining unit 12 determines the target current value Io* such that the driving current Io is set to the upper limit AH of the hysteresis area H. As a result, the driving current Io is set to "Imax" illustrated in FIG. 1B, and thus the driving amount P of the actuator 2 can be quickly increased when the driving current Io increases next.

On the other hand, when it is predicted that the next target driving amount P* is reduced (moves to negative direction), the target current value determining unit 12 determines the target current value Io* such that the driving current Io is set to the lower limit AL of the hysteresis area H. As a result, the driving current Io is set to "Imin" illustrated in FIG. 1B, and thus the driving amount P of the actuator 2 can be quickly decreased when the driving current Io decreases next.

Hereinafter, assuming that a linear solenoid of a solenoid valve mounted on an internal combustion engine of a vehicle is an example of the actuator 2, there is explained a case where the control device 1 is a control device that controls a linear solenoid depending on a control mode corresponding to the state of the vehicle.

2. Internal Combustion Engine

Figure 2:
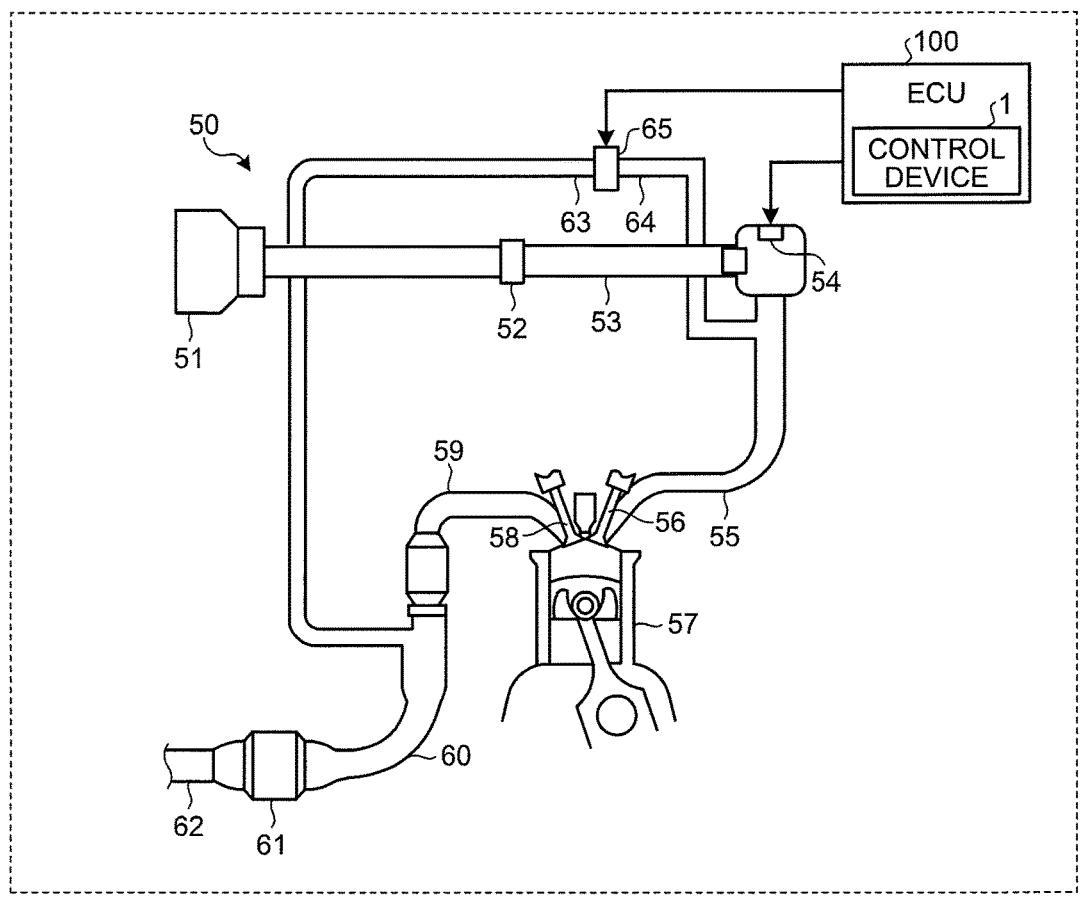
FIG. 2 is a diagram illustrating the outline of an internal combustion engine mounted on a vehicle according to the embodiment.

FIG. 2 is a diagram illustrating the outline of an internal combustion engine 50 according to the embodiment. The internal combustion engine 50 illustrated in FIG. 2 is an engine of a vehicle such as an automobile whose fuel is gasoline, for example. With respect to the internal combustion engine 50, various controls such as combustion control are performed by an electronic control unit 100 (hereinafter, referred to as ECU 100) that includes the control device 1. Hereinafter, the load of the internal combustion engine 50 that is an engine is referred to as an engine load factor KL, and the rotation number of the internal combustion engine 50 is referred to as an engine speed N. Although the internal combustion engine 50 illustrated in FIG. 2 illustrates a one-cylinder internal combustion engine, the internal combustion engine 50 may be a multi-cylinder internal combustion engine.

In order to reduce NOx in exhaust gas discharged by the combustion in the internal combustion engine 50, the internal combustion engine 50 has an exhaust gas recirculation mechanism (EGR mechanism) that sends a part of exhaust gas of the internal combustion engine 50 to its suction side to again suck the part of exhaust gas.

The internal combustion engine 50 includes a suction port 51, a throttle valve 52, suction pipes 53, 55, a suction-pipe pressure sensor 54, a suction valve 56, a cylinder (combustion chamber) 57, an exhaust valve 58, exhaust pipes 59, 60, 62, an NOx occlusion-reduction-type three-way catalyst device 61, an exhaust-side circulation pipe 63, a suction-side circulation pipe 64, and a solenoid valve 65 (example of EGR valve). The throttle valve 52 is provided in the suction pipe 53, and the suction-pipe pressure sensor 54 is provided in a surge tank of the suction pipe 55.

The suction pipe 55 is connected to the cylinder 57 via the suction valve 56, and the exhaust pipe 59 is connected to the cylinder 57 via the exhaust valve 58. Air sucked via the suction pipe 53 from the suction port 51 flows into the suction pipe 55, is sent to the cylinder 57 via the suction valve 56, and is mixed with fuel in the cylinder 57.

Exhaust gas from the cylinder 57 is discharged to the exhaust pipe 59 via the exhaust valve 58. Moreover, a part of exhaust gas discharged from the exhaust pipe 59 flows into the exhaust-side circulation pipe 63, and flows into the suction pipe 55 by way of the suction-side circulation pipe 64 when the solenoid valve 65 is further opened. A flow rate of exhaust gas flowing back into the suction-side circulation pipe 64 (suction side) from the exhaust-side circulation pipe 63 (exhaust side) is adjusted by the solenoid valve 65. As a result, a part of exhaust gas discharged by combustion in the cylinder 57 is sent to its suction side, and thus NOx in exhaust gas is reduced.

Figure 3:
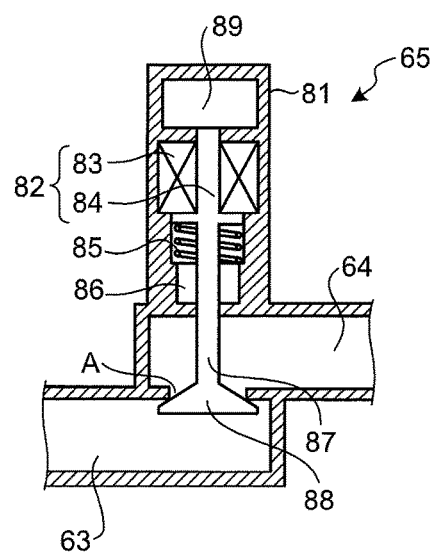
FIG. 3 is a diagram illustrating a configuration example of a solenoid valve according to the embodiment.

FIG. 3 is a diagram illustrating a configuration example of the solenoid valve 65. As illustrated in FIG. 3, the solenoid valve 65 includes a housing 81, a linear solenoid 82 (example of actuator 2), an elastic member 85, a bearing 86, a valve stem 87, and a valve head 88.

The housing 81 is formed in the shape of a hollow tube. The linear solenoid 82, the elastic member 85, and the bearing 86 are arranged inside the housing 81. The housing 81 is formed integrally with the exhaust-side circulation pipe 63 and the suction-side circulation pipe 64, for example.

The valve head 88 and the valve stem 87 that supports the valve head 88 are biased by the elastic member 85 in a predetermined direction (upward direction in FIG. 3), and are arranged to be linearly and slidably moved inside the housing 81, the exhaust-side circulation pipe 63, and the suction-side circulation pipe 64. The bearing 86 supports the valve stem 87 linearly and slidably. The valve head 88 is arranged to be able to close an opening A between the exhaust-side circulation pipe 63 and the suction-side circulation pipe 64, for example.

The linear solenoid 82 adds a thrust to the valve head 88 in a direction (downward direction in FIG. 3) opposite to a predetermined direction in which the elastic member 85 biases the valve head 88. The linear solenoid 82 includes a plunger 84 connected to the valve head 88 via the valve stem 87 and a coil 83 facing the outer circumference of the plunger 84 via a gap.

When the driving current Io is supplied to the coil 83, the plunger 84 of the linear solenoid 82 is moved in the downward direction in FIG. 3 in accordance with the driving current Io. A thrust is added to the valve head 88 along with the movement of the plunger 84, and the valve head 88 is slid. As a result, the solenoid valve 65 is opened because the opening A is opened, and thus exhaust gas flows into the suction-side circulation pipe 64 from the exhaust-side circulation pipe 63.

For example, as illustrated in FIG. 3, a lift sensor 89 is provided at one end of the plunger 84. The lift sensor 89 detects an instantaneous value of a sliding amount of the plunger 84 as an instantaneous value (hereinafter, referred to as lifting amount Pxd) of a lifting amount Px of the linear solenoid 82. The lift sensor 89 outputs the detected lifting amount Pxd to the control device 1.

3. Control Device

Figure 4:
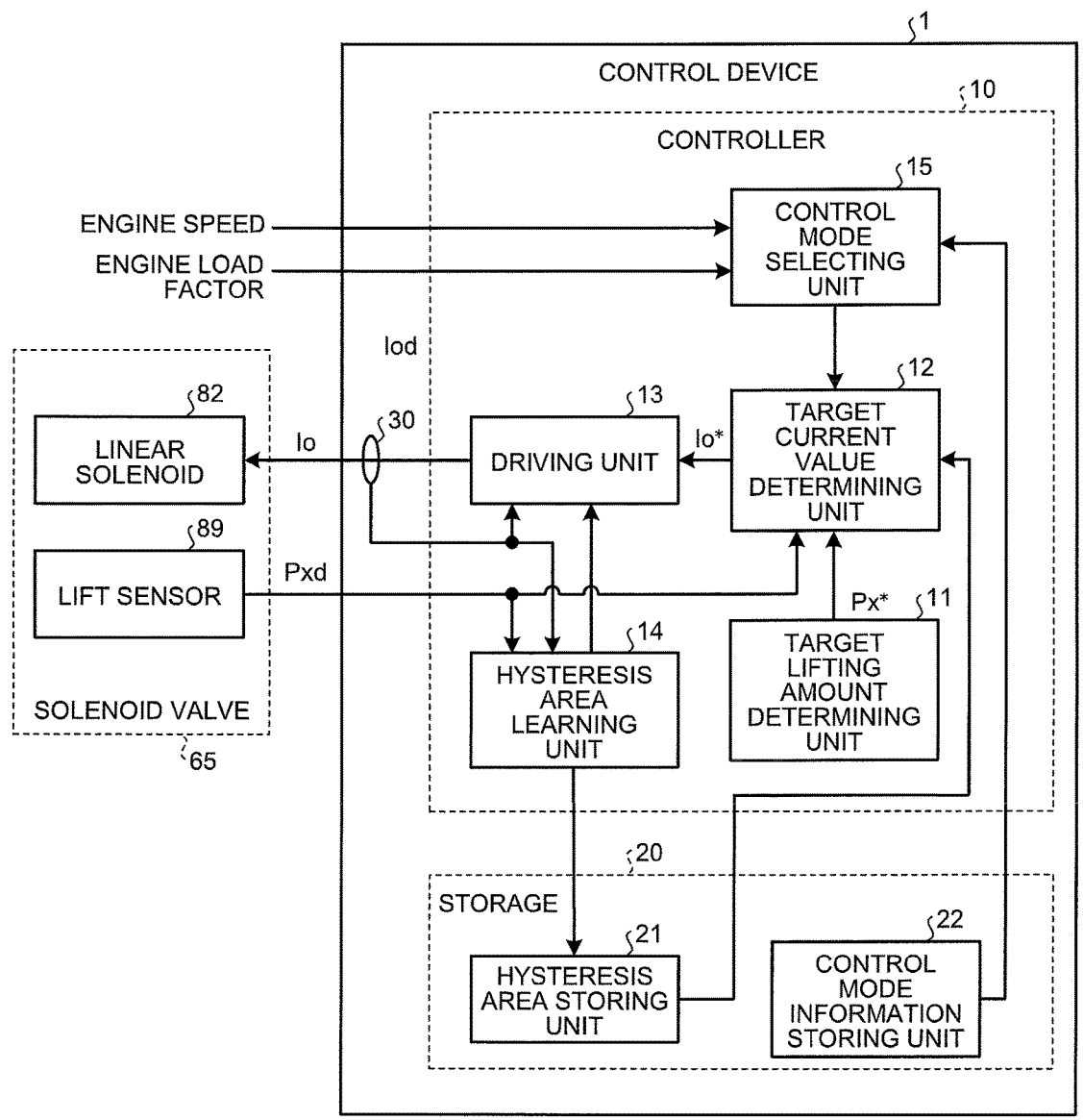
FIG. 4 is a diagram illustrating a specific configuration example of the control device for the solenoid valve according to the embodiment.

Next, the control device 1 included in the ECU 100 will be explained. FIG. 4 is a diagram illustrating a specific configuration example of the control device 1 according to the embodiment. The control device 1 controls the solenoid valve 65.

As illustrated in FIG. 4, the control device 1 includes the controller 10, the storage 20 and a current detecting unit 30. The current detecting unit 30 detects an instantaneous value of the driving current Io output from the controller 10, and outputs the detection result as a driving current value Iod.

The controller 10 includes a target lifting amount determining unit 11, the target current value determining unit 12 (example of determining unit), the driving unit 13, a hysteresis area learning unit 14 (example of learning unit), and the control mode selecting unit 15. The storage 20 includes a hysteresis area storing unit 21 and a control mode information storing unit 22.

The controller 10 includes a central processing unit (CPU), a read only memory (ROM), a random access memory (RAM), an input-output (I/O) port, and an A/D conversion unit, which are interconnected by a bus.

The CPU reads out a program stored in the ROM and performs the program by using the RAM as a working area. As a result, the controller 10 functions as the target lifting amount determining unit 11, the target current value determining unit 12, the driving unit 13, the hysteresis area learning unit 14, and the control mode selecting unit 15. Moreover, at least a part or the whole of these components can be formed of only hardware.

The target lifting amount determining unit 11 determines and outputs the target lifting amount Px* (example of target driving amount P*) that is a target value of the lifting amount Px (hereinafter, referred to as real lifting amount Px) of the linear solenoid 82. The target lifting amount Px* is determined in accordance with a target valve-opened degree of the solenoid valve 65, for example.

The target current value determining unit 12 determines the target current value Io*, in such a manner that the lifting amount Pxd becomes the real lifting amount Px corresponding to the target lifting amount Px*, on the basis of the target lifting amount Px* reported from the target lifting amount determining unit 11 and the lifting amount Pxd reported from the lift sensor 89.

For example, the target current value determining unit 12 performs PI (proportional integral) control or PID (proportional integral and differential) control, in such a manner that a difference between the target lifting amount Px* and the lifting amount Pxd becomes zero, so as to determine the target current value Io*. Moreover, the target current value determining unit 12 determines the target current value Io* in consideration of the hysteresis area H. This case will be below explained in detail.

The driving unit 13 supplies the driving current Io to the linear solenoid 82 so that the driving current value Iod becomes a value according to the target current value Io* on the basis of the target current value Io* and the driving current value Iod.

For example, the driving unit 13 performs the PI control or PID control so that a difference between the target current value Io* and the driving current value Iod becomes zero so as to calculate a modulation factor, and compares the modulation factor and a carrier wave to generate a PWM (pulse width modulation) signal. The driving unit 13 includes, for example, a step-down chopper circuit, and inputs the generated PWM signal into a switching element and supplies the driving current Io from the step-down chopper circuit to the linear solenoid 82.

The driving unit 13 can perform a feedforward control until the lifting amount Pxd becomes an amount smaller than the target lifting amount Px* by a predetermined amount K. In the feedforward control, the driving unit 13 sets the target current value Io* so that a change amount of the target current value Io* becomes larger as a difference between the lifting amount Pxd and the target lifting amount Px* is larger, and supplies the driving current Io according to the target current value Io* to the linear solenoid 82. As a result, the real lifting amount Px can quickly approximate the target lifting amount Px*.

The driving unit 13 performs a feedback control after the lifting amount Pxd becomes the amount smaller than the target lifting amount Px* by the predetermined amount K. In other words, the driving unit 13 supplies the driving current Io to the linear solenoid 82 so that the driving current value Iod becomes a value according to the target current value Io* on the basis of the difference between the target current value Io* and the driving current value Iod. Moreover, the predetermined amount K is made larger as the target lifting amount Px* is larger.

The hysteresis area learning unit 14 learns information on the hysteresis area H for each the real lifting amount Px of the linear solenoid 82, and stores the information in the hysteresis area storing unit 21 of the storage 20. The information on the hysteresis area H is, for example, the upper limit AH, the lower limit AL, and the intermediate value AM of the driving current Io in the hysteresis area H for each the real lifting amount Px.

Figure 5:
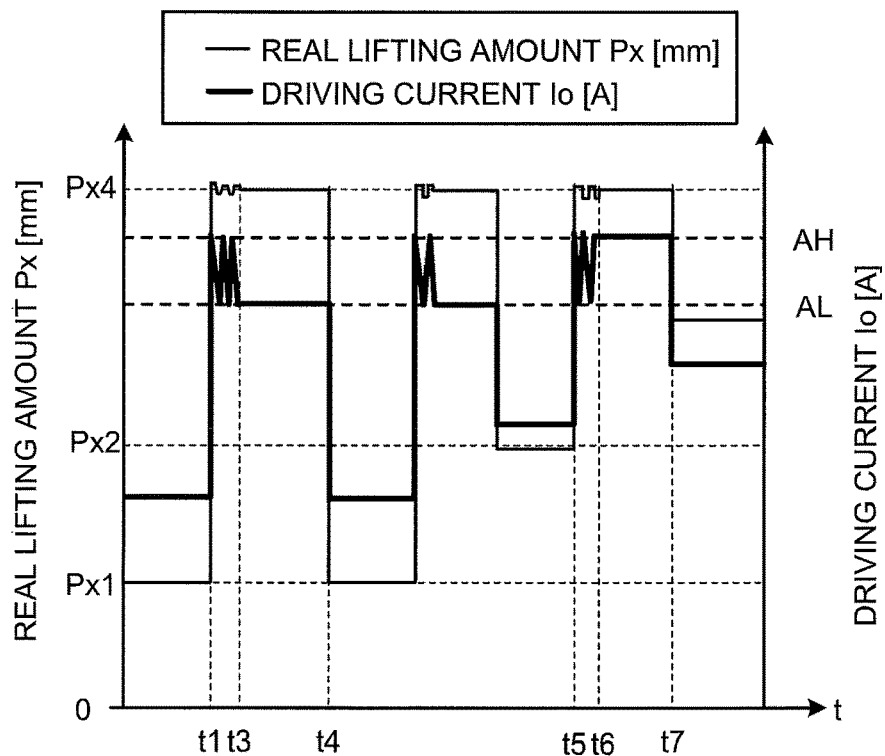
FIG. 5 is a diagram illustrating a relationship between a driving current and a real lifting amount of a linear solenoid by a general feedback control.
Figure 6:
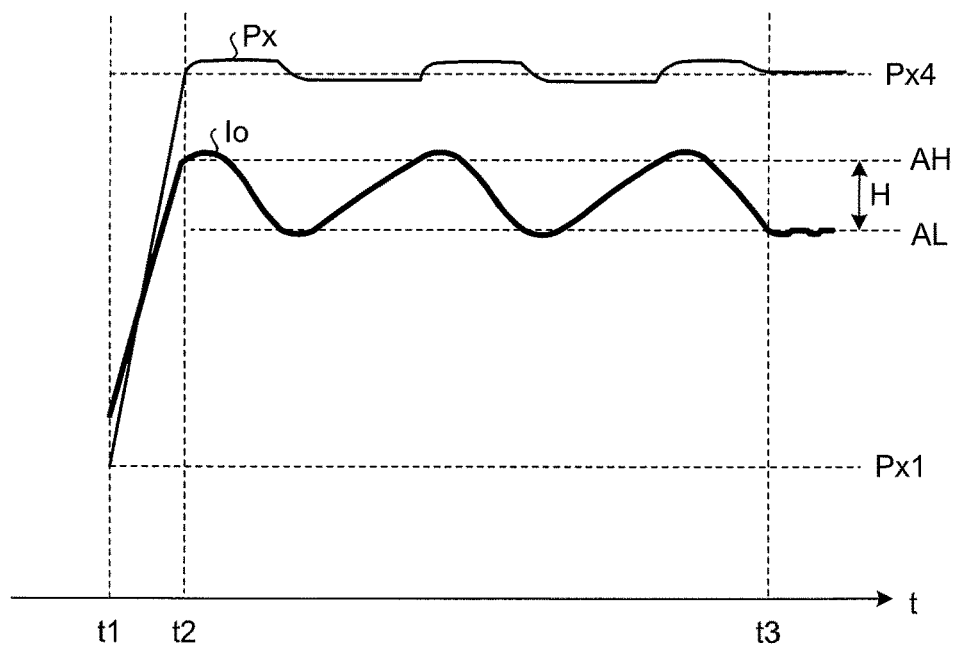
FIG. 6 is a diagram illustrating a relationship between a driving current and a real lifting amount between times t1 to t3 illustrated in FIG. 5.

Herein, the hysteresis area H of the linear solenoid 82 will be explained. FIG. 5 is a diagram illustrating a relationship between the driving current Io and the real lifting amount Px by a general feedback control. FIG. 6 is a diagram illustrating a relationship between the driving current Io and the real lifting amount Px between times t1 to t3 illustrated in FIG. 5.

In the examples illustrated in FIGS. 5 and 6, there are illustrated a state in which the determination of the target current value Io* in consideration of the hysteresis area H is not performed and a state in which the real lifting amount Px is changed between Px4 and Px1 or Px2.

As illustrated in FIGS. 5 and 6, when starting the supply of the driving current Io to the linear solenoid 82 to change the real lifting amount Px from Px1 to Px4 at the time t1, hunting occurs between times t2 and t3 after the real lifting amount Px arrives at Px4 at the time t2. After that, the driving current Io converges near the lower limit AL of the hysteresis area H between times t3 to t4.

When supplying the driving current Io to the linear solenoid 82 to change the real lifting amount Px from Px2 to Px4 at a time t5, hunting occurs between times t5 and t6 due to the presence of the hysteresis area H after the real lifting amount Px arrives at Px4. After that, the driving current Io converges near the upper limit AH of the hysteresis area H between times t6 and t7.

As described above, when raising the real lifting amount Px, the driving current Io converges near the lower limit AL or the upper limit AH of the hysteresis area H after hunting has occurred. The reason of the change of the driving current Io as described above is because the vicinity in the hysteresis area H is an area in which the position P of the actuator 2 is not substantially changed even if the driving current Io is changed.

In other words, the reason is that, after the real lifting amount Px arrives at Px4, it is required to flow a current large than a current width AW (=AH−AL) corresponding to the hysteresis area H when decreasing the driving current Io in order to match up the real lifting amount Px with Px4. Hereinafter, the driving current Io converging near the lower limit AL or the upper limit AH after hunting is referred to as a convergence current.

As described above, the hysteresis area learning unit 14 learns information on the hysteresis area H for each of the target lifting amounts Px1*, Px2*, . . . , and Pxn* (n is natural number) of the linear solenoid 82, and stores the information in the hysteresis area storing unit 21 of the storage 20. Moreover, the target lifting amounts Px1* to Pxn* are obtained by segmenting the target lifting amount Px* in accordance with the size, and their sizes are as follows: Px1*<Px2*< . . . <Pxn*. The target lifting amount Pxn* can be expressed by Pxn*=n×Pxp, for example.

For example, the hysteresis area learning unit 14 sets the target lifting amount Px* to Px1*, and performs the PI control or PID control, in such a manner that a difference between the target lifting amount Px* (=Px1*) and the lifting amount Pxd becomes zero, to determine the target current value Io*.

Then, the hysteresis area learning unit 14 causes the driving unit 13 to supply the driving current Io according to the target current value Io* to the actuator 2. At this time, as illustrated in FIG. 6, the driving current Io fluctuates over the hysteresis area H. Therefore, the hysteresis area learning unit 14 determines the upper limit AH, the lower limit AL, and the intermediate value AM (=(+AL)/2) of the hysteresis area H for the target lifting amount Px1* on the basis of a fluctuation range of the driving current Io.

The hysteresis area learning unit 14 may determine the upper limit AH, the lower limit AL, and the intermediate value AM (=(+AL)/2) of the hysteresis area H for the target lifting amount Px1* on the basis of the size of the convergence current.

For example, the hysteresis area learning unit 14 performs, multiple times, a process for outputting from the driving unit 13 the driving current Io by which the lifting amount Pxd is matched up with the target lifting amount Px1*, and detects a convergence current near the upper limit AH and a convergence current near the lower limit AL on the basis of the driving current value Iod. Then, the hysteresis area learning unit 14 sets the values of the detected convergence currents to the upper limit AH and the lower limit AL of the hysteresis area H for the target lifting amount Px1*, and determine the intermediate value AM from the upper limit AH and the lower limit AL.

The hysteresis area learning unit 14 determines the upper limit AH, the lower limit AL, and the intermediate value AM of the hysteresis area H for the target lifting amount Px1*, and then stores the determination results in a table of the hysteresis area storing unit 21.

Similarly to the case of the target lifting amount Px1*, the hysteresis area learning unit 14 determines the upper limit AH, the lower limit AL, and the intermediate value AM of the hysteresis area H for each of the target lifting amounts Px2* to Pxn*, and stores the determination results in the table of the hysteresis area storing unit 21.

Figures 7, 8:
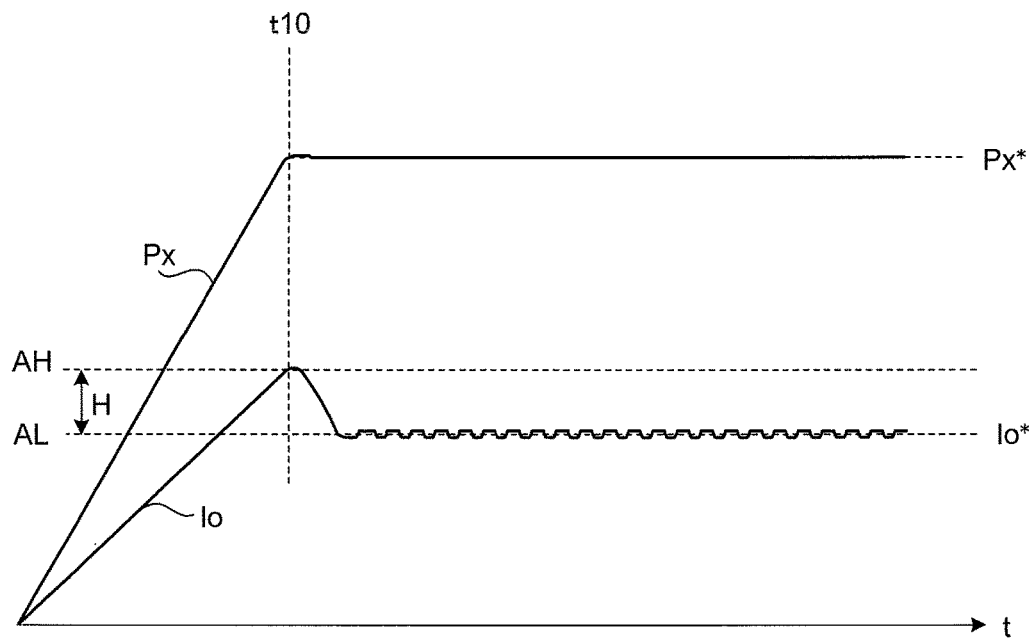
FIG. 7 is a diagram illustrating an example of a table that indicates a hysteresis area for each target lifting amount according to the embodiment.
FIG. 8 is a diagram illustrating a time change of a real lifting amount and a driving current when setting a target current value to a lower limit of the hysteresis area.

FIG. 7 is a diagram illustrating an example of a table that indicates the hysteresis area H for each of the target lifting amounts Px1* to Pxn* according to the embodiment. In the table illustrated in FIG. 7, the upper limit AH, the lower limit AL, and the intermediate value AM of the hysteresis area H are associated with each of the target lifting amounts Px1* to Pxn*. For example, in the example illustrated in FIG. 7, the upper limit AH, the lower limit AL, and the intermediate value AM of the hysteresis area H for the target lifting amount Px1* are indicated as an upper limit AH1, a lower limit AL1, and an intermediate value AM1.

As described above, the hysteresis area learning unit 14 can learn the information on the hysteresis area H for each the target lifting amount Px* that stepwise increases in units of Pxp. However, the embodiment is not limited to such an example.

For example, the hysteresis area learning unit 14 can calculate functions $f_{AH}(Px^*)$, $f_{AL}(Px^*)$, and $f_{AM}(Px^*)$, which indicate relationships between the target lifting amount Px* and "the upper limit AH, the lower limit AL, and the intermediate value AM", on the basis of the hysteresis area H for each the target lifting amount Px* that stepwise increases in units of Pxp. The hysteresis area learning unit 14 can store information on these functions in the storage 20. Moreover, the following expressions are accomplished: $f_{AH}(Px^*)=AH$, $f_{AL}(Px^*)=AL$, and $f_{AM}(Px^*)=AM$.

The hysteresis area learning unit 14 may learn information on the hysteresis area H for each the target lifting amount Px* for each of at least one of the engine load factor KL, the engine speed N, the pressure of the suction pipe 55, and the ambient temperature of the linear solenoid 82. As a result, it is possible to improve learning accuracy of the hysteresis area H.

Returning to FIG. 4, the explanations of the controller 10 are continued. The control mode selecting unit 15 of the controller 10 selects one control mode from among a plurality of control modes on the basis of the state of the internal combustion engine 50 (engine), and notifies the target current value determining unit 12 of the selection result.

The electronic control unit 100 includes a detecting unit (not illustrated) that detects the engine speed N and the engine load factor KL. The control device 1 is notified of information on the engine speed N and the engine load factor KL detected by the detecting unit. Herein, the engine load factor KL indicates a ratio of a torque of the internal combustion engine 50 to the maximum torque of the internal combustion engine 50. The maximum torque of the internal combustion engine 50 is different depending on the engine speed N.

The control mode selecting unit 15 selects one control mode from among the plurality of control modes on the basis of the information on the engine speed N and the engine load factor KL reported from the detecting unit not illustrated. Herein, the plurality of control modes includes first to third control modes.

The first control mode (example of first mode) is a control mode for suppressing the variation of the real lifting amount Px of the linear solenoid 82. The second control mode (example of second mode) is a control mode for suppressing the power consumption of the linear solenoid 82. The third control mode (example of third mode) is a control mode having high responsiveness when the real lifting amount Px of the linear solenoid 82 is changed.

The target current value determining unit 12 determines the target current value Io* according to the hysteresis area H corresponding to the target lifting amount Px* on the basis of the control mode selected by the control mode selecting unit 15. The target current value determining unit 12 can determine the target current value Io* so that the driving current Io becomes any of the upper limit AH, the lower limit AL, and the intermediate value AM of the hysteresis area H.

The target current value determining unit 12 can acquire at least one of the engine load factor KL, the engine speed N, the pressure of the suction pipe 55, and the ambient temperature of the linear solenoid 82. In this case, the target current value determining unit 12 can acquire, from the hysteresis area storing unit 21, information on the hysteresis area H corresponding to at least one of the engine load factor KL, the engine speed N, the pressure of the suction pipe 55, and the ambient temperature of the linear solenoid 82, in addition to the target lifting amount Px*. As a result, determination accuracy of the hysteresis area H can be improved.

FIG. 8 is a diagram illustrating a time change of the real lifting amount Px and the driving current Io when the target current value Io* is set so that the driving current Io becomes the lower limit AL of the hysteresis area H.

As illustrated in FIG. 8, the target current value determining unit 12 determines the target current value Io* so that a difference between the lifting amount Pxd and the target lifting amount Px* becomes small by a lifting-amount feedback control until the real lifting amount Px reaches the target lifting amount Px*.

After that, when it is determined that the real lifting amount Px reaches the target lifting amount Px* (time t10), the target current value determining unit 12 determines the lower limit AL of the hysteresis area H corresponding to the target lifting amount Px* as the target current value Io*, and outputs the target current value Io* to the driving unit 13. At this time, the target current value determining unit 12 stops the feedback control of the real lifting amount Px.

For example, it is assumed that the table stored in the hysteresis area storing unit 21 is in the state illustrated in FIG. 7 and the target lifting amount Px* is Px1*. In this case, the target current value determining unit 12 determines the lower limit AL1 illustrated in FIG. 7 as the target current value Io*. As a result, the feedback control is performed on the driving current Io near the lower limit AL1 of the hysteresis area H.

Figure 9:
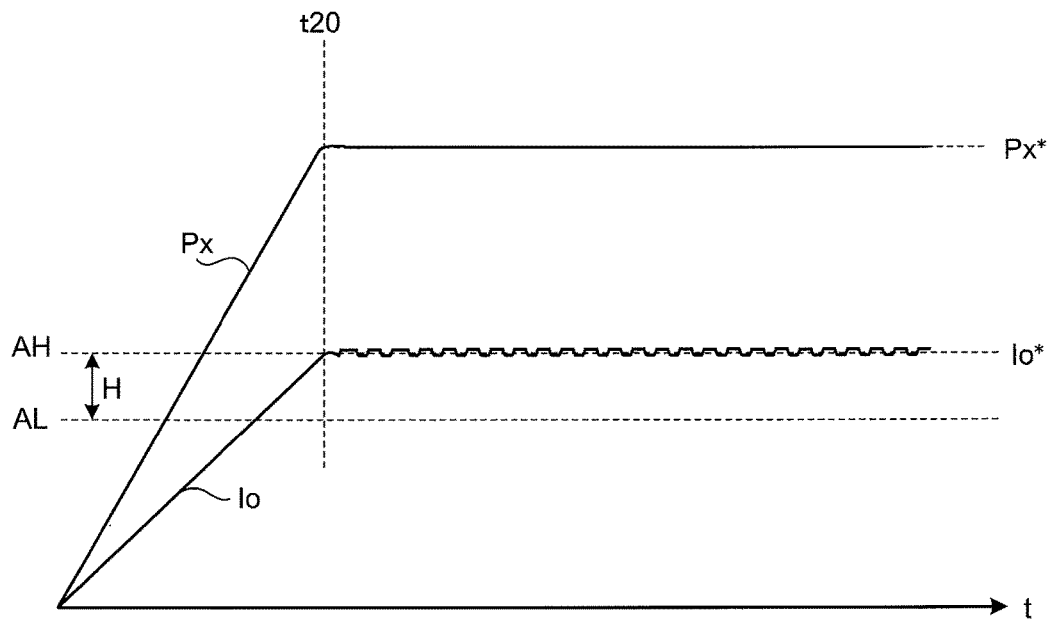
FIG. 9 is a diagram illustrating a time change of a real lifting amount and a driving current when setting a target current value to an upper limit of the hysteresis area.

FIG. 9 is a diagram illustrating a time change of the real lifting amount Px and the driving current Io when the target current value Io* is set so that the driving current Io becomes the upper limit AH of the hysteresis area H. Moreover, operations of the target current value determining unit 12 until the real lifting amount Px reaches the target lifting amount Px* are similar to the example illustrated in FIG. 8.

As illustrated in FIG. 9, when it is determined that the real lifting amount Px reaches the target lifting amount Px* (time t20), the target current value determining unit 12 determines the upper limit AH of the hysteresis area H corresponding to the target lifting amount Px* as the target current value Io*, and outputs the target current value Io* to the driving unit 13. At this time, the target current value determining unit 12 stops the feedback control of the real lifting amount Px.

For example, it is assumed that the table stored in the hysteresis area storing unit 21 is in the state illustrated in FIG. 7 and the target lifting amount Px* is Px1*. In this case, the target current value determining unit 12 determines the upper limit AH1 illustrated in FIG. 7 as the target current value Io*. As a result, the feedback control is performed on the driving current Io near the upper limit AH1 of the hysteresis area H.

Figure 10:
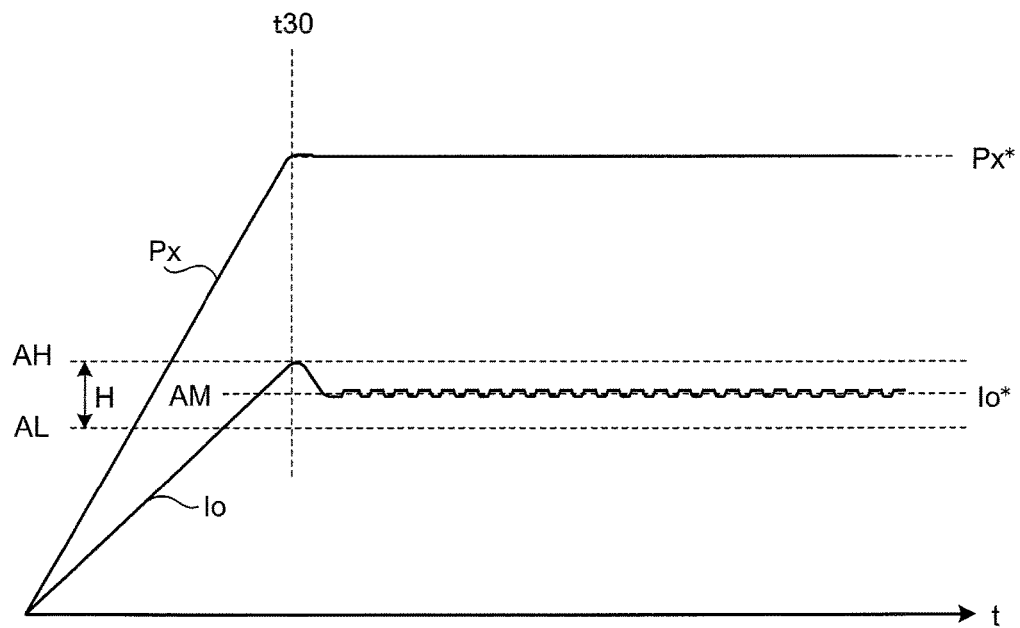
FIG. 10 is a diagram illustrating a time change of a real lifting amount and a driving current when setting a target current value to an intermediate value of the hysteresis area.

FIG. 10 is a diagram illustrating a time change of the real lifting amount Px and the driving current Io when the target current value Io* is set so that the driving current Io becomes the intermediate value AM of the hysteresis area H. Moreover, operations of the target current value determining unit 12 until the real lifting amount Px reaches the target lifting amount Px* are similar to the example illustrated in FIG. 8.

As illustrated in FIG. 10, when it is determined that the real lifting amount Px reaches the target lifting amount Px* (time t30), the target current value determining unit 12 determines the intermediate value AM of the hysteresis area H corresponding to the target lifting amount Px* as the target current value Io*, and outputs the target current value Io* to the driving unit 13. At this time, the target current value determining unit 12 stops the feedback control of the real lifting amount Px.

For example, it is assumed that the table stored in the hysteresis area storing unit 21 is in the state illustrated in FIG. 7 and the target lifting amount Px* is Px1*. In this case, the target current value determining unit 12 determines the intermediate value AM1 illustrated in FIG. 7 as the target current value Io*. As a result, the feedback control is performed on the driving current Io near the intermediate value AM1 of the hysteresis area H.

As described above, after the real lifting amount Px reaches the target lifting amount Px*, the target current value determining unit 12 can determine the target current value Io* so that the driving current Io becomes any of the lower limit AL, the upper limit AH, and the intermediate value AM of the hysteresis area H corresponding to the target lifting amount Px*.

A determination method of the target current value Io* performed by the target current value determining unit 12 is not limited to the process. For example, after the real lifting amount Px reaches the target lifting amount Px*, the target current value determining unit 12 can determine the target current value Io* so that the driving current Io has a slightly higher value than the lower limit AL of the hysteresis area H corresponding to the target lifting amount Px*.

After the real lifting amount Px reaches the target lifting amount Px*, the target current value determining unit 12 can determine the target current value Io* so that the driving current Io has a slightly lower value than the upper limit AH of the hysteresis area H corresponding to the target lifting amount Px*.

After the real lifting amount Px reaches the target lifting amount Px*, the target current value determining unit 12 can determine the target current value Io* so that the driving current Io has a slightly lower or slightly higher value than the intermediate value AM of the hysteresis area H corresponding to the target lifting amount Px*.

As described above, after the real lifting amount Px reaches the target lifting amount Px*, the target current value determining unit 12 can determine the target current value Io* so that the driving current Io becomes a value according to the hysteresis area H corresponding to the target lifting amount Px*, and output the target current value Io* to the driving unit 13.

Figure 11:
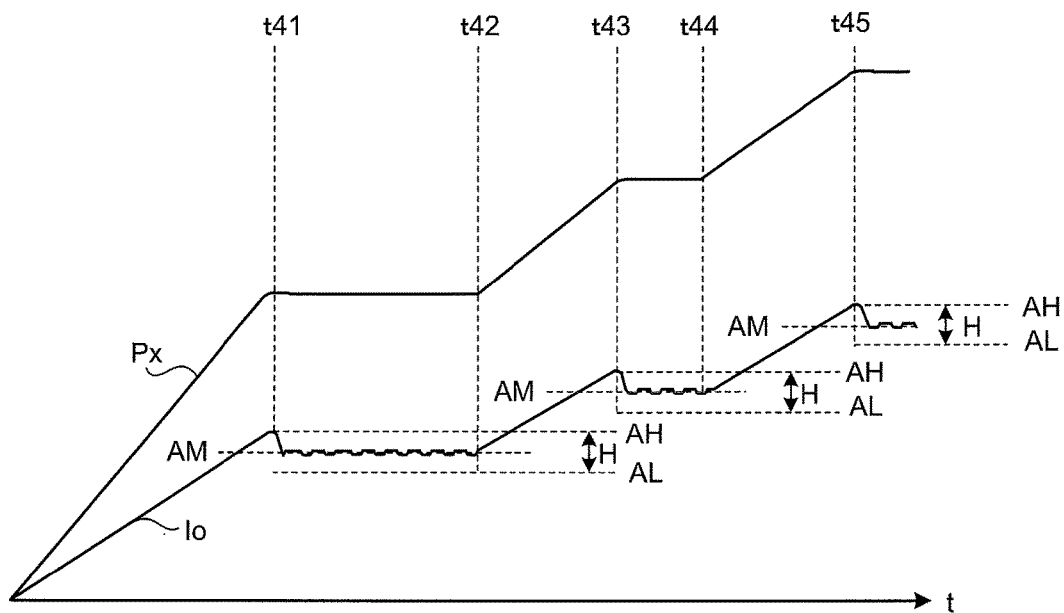
FIG. 11 is a diagram illustrating a time change of a real lifting amount and a driving current in a first control mode.
Figure 12:
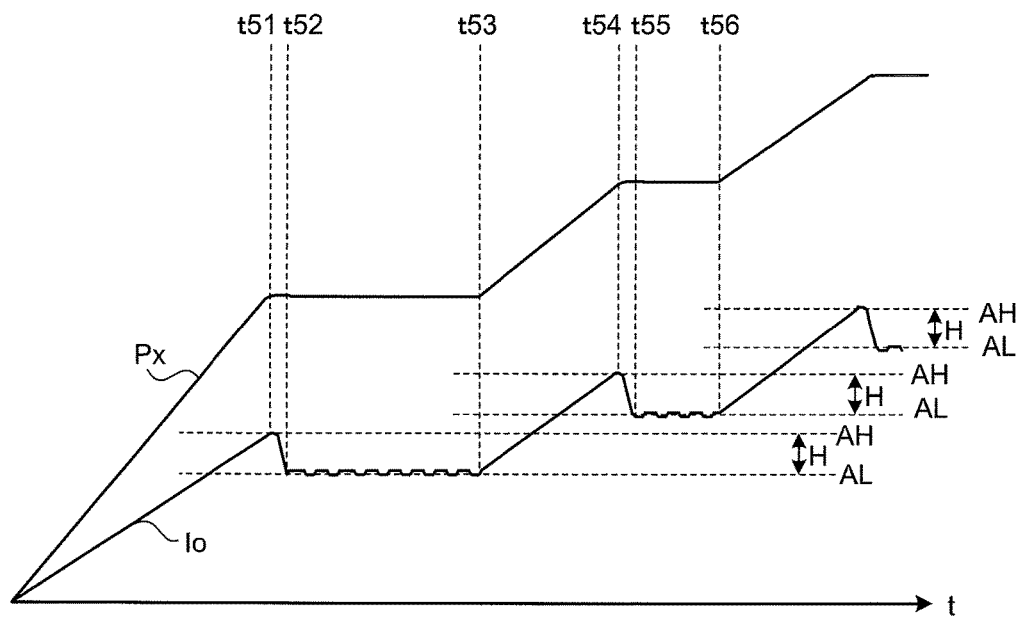
FIG. 12 is a diagram illustrating a time change of a real lifting amount and a driving current in a second control mode.
Figure 13:
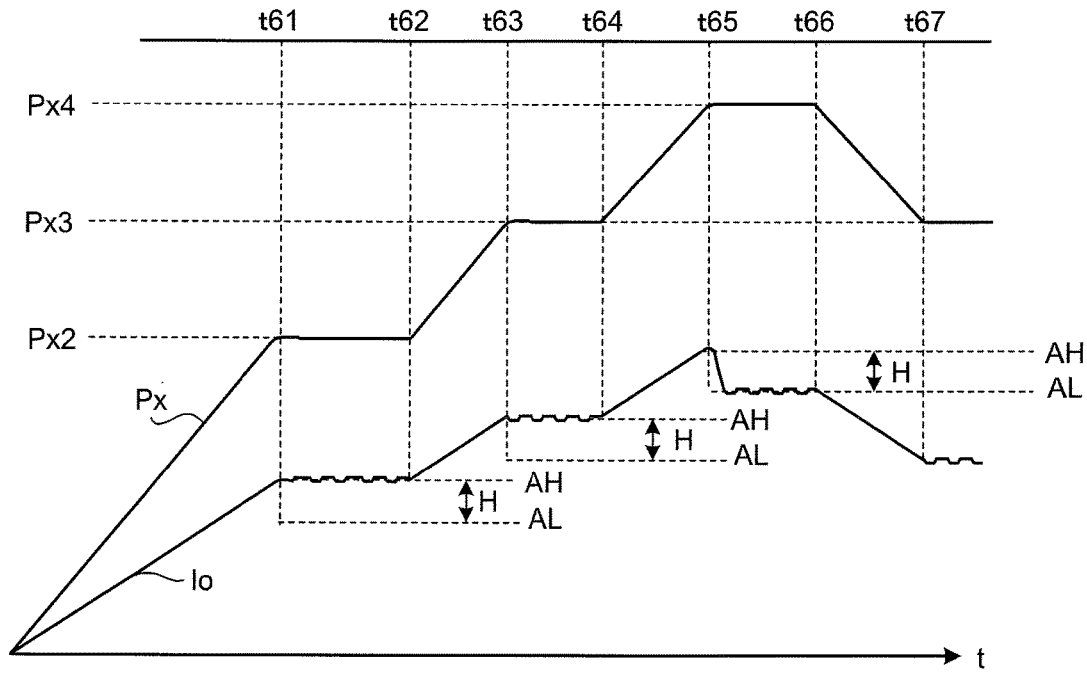
FIG. 13 is a diagram illustrating a change of a real lifting amount and a driving current in a third control mode.

Furthermore, the target current value determining unit 12 can determine the target current value Io* according to the hysteresis area H corresponding to the target lifting amount Px* in accordance with a control mode selected by the control mode selecting unit 15. FIG. 11 is a diagram illustrating the change of the real lifting amount Px and the driving current Io in the first control mode. FIG. 12 is a diagram illustrating the change of the real lifting amount Px and the driving current Io in the second control mode. FIG. 13 is a diagram illustrating the change of the real lifting amount Px and the driving current Io in the third control mode.

For example, when the control mode selected by the control mode selecting unit 15 is the first control mode, the target current value determining unit 12 determines the target current value Io* so that the driving current Io becomes the intermediate value AM of the hysteresis area H whenever the target lifting amount Px* is changed.

As a result, as illustrated in FIG. 11, the driving current Io can be stably maintained within the hysteresis area H in intervals (for example, times t41 to t42 and times t43 to t44) between a time at which the real lifting amount Px reaches the target lifting amount Px* and a time at which the target lifting amount Px* is next changed. For that reason, the real lifting amount Px of the linear solenoid 82 can be stably maintained.

When the control mode selected by the control mode selecting unit 15 is the second control mode, the target current value determining unit 12 determines the target current value Io* so that the driving current Io becomes the lower limit AL of the hysteresis area H whenever the target lifting amount Px* is changed.

As a result, as illustrated in FIG. 12, the driving current Io can be set to a value near the lower limit AL in intervals (for example, times t52 to t53 and times t55 to t56) between the convergence of the driving current Io after it is changed to the real lifting amount Px according to the target lifting amount Px* and a time at which it is changed to the real lifting amount Px according to the next target lifting amount Px*. For that reason, power consumption of the linear solenoid 82 can be reduced.

When the control mode selected by the control mode selecting unit 15 is the third control mode, the target current value determining unit 12 determines the target current value Io* so that the driving current Io becomes the upper limit AH or the lower limit AL of the hysteresis area H on the basis of the increasing and decreasing directions of the target lifting amount Px* to be next predicted whenever the target lifting amount Px* is changed.

For example, as illustrated in FIG. 13, the target current value determining unit 12 determines the target current value Io* such that the driving current Io becomes the upper limit AH of the hysteresis area H when it is predicted that the next target lifting amount Px* moves in an increasing direction. As a result, compared to a case where the driving current Io is near the lower limit AL and the intermediate value AM of the hysteresis area H, the movement to the next real lifting amount Px can be quickly performed.

For example, a traveling time (times t62 to t63 illustrated in FIG. 13) from the real lifting amount Px2 to the real lifting amount Px3 and a traveling time (times t64 to t65 illustrated in FIG. 13) from the real lifting amount Px3 to the real lifting amount Px4 can be shortened compared to the first and second control modes. For that reason, responsiveness of the solenoid valve 65 can be improved.

As illustrated in FIG. 13, the target current value determining unit 12 determines the target current value Io* such that the driving current Io becomes the lower limit AL of the hysteresis area H when it is predicted that the next target lifting amount Px* moves in a decreasing direction. As a result, compared to a case where the driving current Io is near the upper limit AH or the intermediate value AM of the hysteresis area H, the movement to the next real lifting amount Px can be quickly performed.

For example, a traveling time (times t66 to t67 illustrated in FIG. 13) from the real lifting amount Px4 to the real lifting amount Px3 can be shortened compared to the first and second control modes. For that reason, responsiveness of the solenoid valve 65 can be improved.

As described above, the target current value determining unit 12 determines the target current value Io* so that the driving current Io becomes a value corresponding to any of the upper limit AH, the lower limit AL, and the intermediate value AM according to the hysteresis area H corresponding to the target lifting amount Px* after the real lifting amount Px reaches the target lifting amount Px*. However, the embodiment is not limited to such an example.

For example, the target current value determining unit 12 can determine the target current value Io* in accordance with control modes obtained by combining two or more modes of the first to third control modes. For example, the target current value determining unit 12 can determine the lower limit AL as the target current value Io* and then determine the upper limit AH as the target current value Io* in an interval between a time at which the real lifting amount Px reaches the target lifting amount Px* and a time at which the target lifting amount Px* is next changed.

The target current value determining unit 12 can determine the intermediate value AM as the target current value Io* and then determine the upper limit AH as the target current value Io* in an interval between a time at which the real lifting amount Px reaches the target lifting amount Px* and a time at which the target lifting amount Px* is next changed.

The target current value determining unit 12 can determine the target current value Io* on the basis of the increasing and decreasing directions of the target lifting amount Px* to be next predicted, and determine the intermediate value AM as the target current value Io* when the target lifting amount Px* is not changed more than a predetermined time, after the real lifting amount Px reaches the target lifting amount Px*.

When a term until the target lifting amount Px* is next changed can be predicted like automatic driving control etc., for example, the target current value determining unit 12 first determines the lower limit AL as the target current value Io* after the real lifting amount Px reaches the target lifting amount Px*. After that, the target current value determining unit 12 determines the target current value Io* on the basis of the increasing and decreasing directions of the target lifting amount Px* immediately before the target lifting amount Px* is next changed (or before a predetermined term). As a result, responsiveness of the solenoid valve 65 can be enhanced while suppressing power consumption of the solenoid valve 65.

The target current value determining unit 12 first determines the intermediate value AM as the target current value Io* after the real lifting amount Px reaches the target lifting amount Px*. After that, the target current value determining unit 12 determines the target current value Io* on the basis of the increasing and decreasing directions of the target lifting amount Px* immediately before the target lifting amount Px* is next changed (or before the predetermined term). As a result, responsiveness of the solenoid valve 65 can be enhanced while stably maintaining the valve-opened state of the solenoid valve 65.

Figure 14:
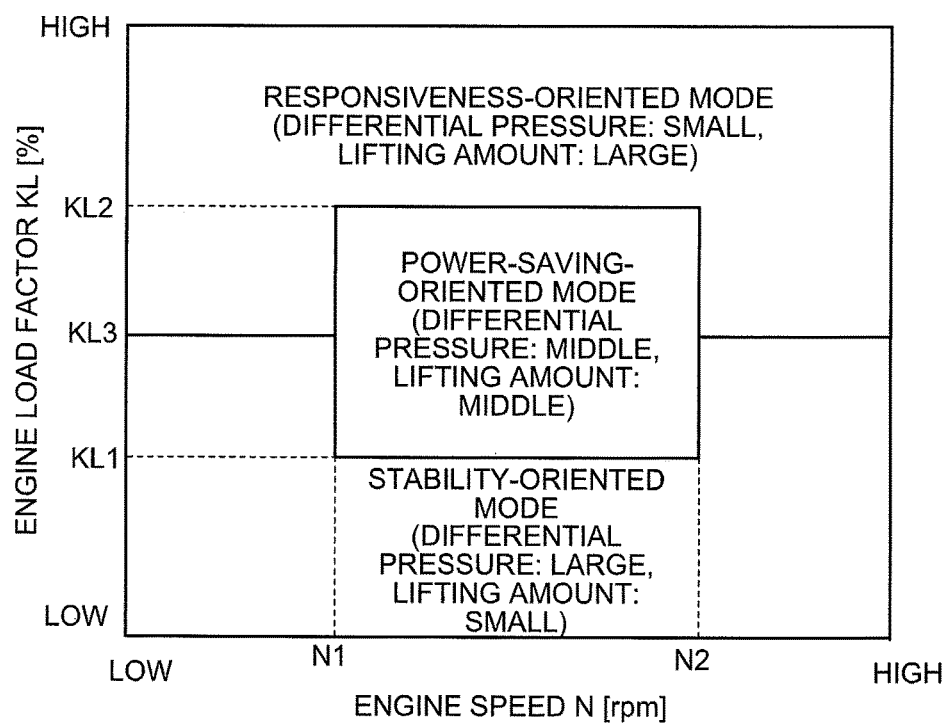
FIG. 14 is a diagram illustrating a relationship between an engine speed and an engine load factor in each control mode.

Herein, an example of a selection method of a control mode using the engine speed N and the engine load factor KL will be explained. FIG. 14 is a diagram illustrating a relationship between the engine speed N and the engine load factor KL in each control mode. In FIG. 14, the first control mode is referred to as a stability-oriented mode, the second control mode is referred to as a power-saving-oriented mode, and the third control mode is referred to as a responsiveness-oriented mode.

As illustrated in FIG. 14, when the engine speed N is a medium degree (N1≤N≤N2) and the engine load factor KL is a medium degree (KL1≤KL≤KL2), the target current value determining unit 12 selects the second control mode (power-saving-oriented mode).

The engine speed N and the engine load factor KL have a state where a time in which the engine speed N is a medium degree and the engine load factor KL is a medium degree is relatively long. Therefore, in this case, the target current value determining unit 12 selects the second control mode (power-saving-oriented mode) to suppress power consumption in a vehicle on which the internal combustion engine 50 is mounted.

When the engine load factor KL is low (range of KL<KL3, except areas of N1<N<N2 and KL>KL1), the target current value determining unit 12 selects the first control mode (power-saving-oriented mode).

Because a differential pressure between suction and exhaust is large when the engine load factor KL is low, an amount of recirculated exhaust gas becomes large and fuel in the internal combustion engine 50 cannot be burned to fail to ignite when the precision of control of the real lifting amount Px is bad.

Therefore, in this case, the target current value determining unit 12 selects the first control mode (power-saving-oriented mode) to suppress the change of the real lifting amount Px caused by the feedback control. As a result, the real lifting amount Px is maintained to be the stable real lifting amount Px and an amount of recirculated exhaust gas becomes large, and thus failure to ignite in the internal combustion engine 50 can be suppressed.

When the engine load factor KL is high (range of KL>KL3, except areas of N1<N<N2 and KL<KL2), the target current value determining unit 12 selects the third control mode (responsiveness-oriented mode).

Because a differential pressure between suction and exhaust is small when the engine load factor KL is high, a change amount of a valve-opened degree of the solenoid valve 65 is large compared to the case where the differential pressure between suction and exhaust is large when an amount of recirculated exhaust gas is changed. For that reason, in this case, the target current value determining unit 12 selects the third control mode (responsiveness-oriented mode) to improve the responsiveness of the solenoid valve 65. As a result, an amount of exhaust gas to be recirculated can be quickly changed.

The selection method of a control mode illustrated in FIG. 14 is only an example. Therefore, a selection method of a control mode is not limited to such an example. For example, the target current value determining unit 12 may select a fourth control mode not considering the hysteresis area H in addition to the first to third control modes considering the hysteresis area H.

The target current value determining unit 12 can select a control mode on the basis of a pressure of the suction pipe 55 and an ambient temperature of the linear solenoid 82 in addition to the engine load factor KL and the engine speed N of a vehicle on which the internal combustion engine 50 is mounted.

The target current value determining unit 12 can select a control mode in accordance with the characteristic of a vehicle on which the internal combustion engine 50 is mounted and the characteristic of a driver. For example, when a driver performs driving such that the engine load factor KL and the engine speed N are little changed, the target current value determining unit 12 can select the first control mode (stability-oriented mode). Moreover, when a driver performs driving such that the engine load factor KL and the engine speed N are changed frequently and largely, the target current value determining unit 12 can select the third control mode (responsiveness-oriented mode).

The target current value determining unit 12 can select a control mode in accordance with the type of a road (for example, express highway, public highway) on which a vehicle on which the internal combustion engine 50 is mounted is traveling, the traffic-jam state of a road on which the vehicle is traveling, a traveling time zone, weather, a day of the week, etc.

The target current value determining unit 12 can select a control mode that is set by an occupant of a vehicle, on which the internal combustion engine 50 is mounted, via an input device (not illustrated). As a result, for example, a control mode can be set according to a preference of the occupant.

4. Process by Controller

Next, a flow example of a process that is executed by the controller 10 will be explained by using a flowchart. FIG. 15 is a flowchart illustrating an example of a processing procedure that is executed by the controller 10. The processing procedure is a process to be repeatedly performed.

As illustrated in FIG. 15, the controller 10 determines whether it is a hysteresis-area learning mode (Step S10). The hysteresis-area learning mode is set via an input device (not illustrated), for example.

When it is determined that it is the hysteresis-area learning mode (Step S10: Yes), the controller 10 learns the hysteresis area H and stores the learning result in the storage 20 (Step S11). As described above, the learning of the hysteresis area H is performed, for example, for each the target lifting amount Px*, and is performed by determining the lower limit AL, the upper limit AH, and the intermediate value AM of the hysteresis area H with respect to each the target lifting amount Px*.

When the process of Step S11 is terminated or when it is determined that it is not the hysteresis-area learning mode (Step S10: No), the controller 10 determines whether it is a normal control mode (Step S12). Herein, the normal control mode means that it is not the hysteresis-area learning mode, and the hysteresis-area learning mode of Step S11 is terminated when the learning of the hysteresis area H is terminated.

When it is determined that it is the normal control mode (Step S12: Yes), the controller 10 acquires information on the engine load factor KL and the engine speed N (Step S13). Then, the controller 10 selects a control mode according to the engine load factor KL and the engine speed N (Step S14), and controls the linear solenoid 82 in the selected control mode (Step S15).

When the process of Step S15 is terminated or when it is determined that it is not the normal control mode (Step S12: No), the controller 10 repeats the process illustrated in FIG. 15 after a predetermined time.

As described above, the control device 1 according to the embodiment includes the storage 20, the target current value determining unit 12 (example of determining unit), and the driving unit 13. The storage 20 stores therein the information on the hysteresis area H of the actuator 2. The target current value determining unit 12 determines the target current value Io* according to the hysteresis area H whose information is stored in the storage 20, on the basis of a control mode. The driving unit 13 supplies the driving current Io according to the target current value Io* determined by the target current value determining unit 12 to the actuator 2. As a result, controllability of the actuator 2 can be improved.

The control device 1 includes the control mode selecting unit 15 (example of mode selecting unit) that selects a control mode from among the plurality of control modes in accordance with the state of an apparatus (for example, vehicle) in which the actuator 2 is placed. As a result, the actuator 2 can be controlled in a control mode according to the state of the apparatus in which the actuator 2 is placed.

The target current value determining unit 12 sets a target current value according to a control mode on the basis of the lower limit AL, the upper limit AH, or the intermediate value AM of the hysteresis area H. As a result, for example, it is possible to suppress power consumption of the actuator 2, to enhance responsiveness when the driving amount P of the actuator 2 is changed, or to suppress a variation of the driving amount P of the actuator 2.

The plurality of control modes includes the first to third control modes (example of first to third modes). The first control mode is a control mode for suppressing a variation of the driving amount P of the actuator 2. The second control mode is a control mode for suppressing power consumption of the actuator 2. The third control mode is a control mode having high responsiveness when the driving amount P of the actuator 2 is changed. The control mode selecting unit 15 selects a control mode from among the first to third modes in accordance with the state of an apparatus in which the actuator 2 is placed. As a result, an appropriate process can be performed on the actuator 2 in accordance with the state of the apparatus in which the actuator 2 is placed.

The actuator 2 is the linear solenoid 82 provided in the solenoid valve 65 (example of EGR valve). The control mode selecting unit 15 selects a control mode from among the first to third modes on the basis of the engine speed N and the engine load factor KL. As a result, an appropriate process can be performed on the linear solenoid 82 in accordance with the state of an engine.

The control device 1 includes the hysteresis area learning unit 14 (example of learning unit) that learns the hysteresis area H on the basis of the driving current Io and the driving amount of the actuator 2. As a result, even when an apparatus in which the actuator 2 is placed is a new apparatus or is an apparatus having fluctuation, the control of the actuator 2 in consideration of the hysteresis area H can be performed with high precision.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
 a storage configured to store information of a hysteresis area of an actuator, the hysteresis area being a performance region of the actuator within which a driving amount of the actuator is maintained at a predetermined target driving amount of the actuator and a driving current supplied to the actuator is changed; and
 a processor configured to:
  select a control mode from a plurality of control modes based on a state of an apparatus within which the actuator is disposed;
  determine a value of the driving current based on a target current value such that the driving amount of the actuator corresponds to the predetermined target driving amount;
  supply the determined driving current according to the target current value to the actuator based on the control mode while maintaining the driving amount of the actuator at the predetermined target driving amount; and
  upon determining that the driving amount of the actuator equals the predetermined target driving amount based on a detected driving amount detected by a sensor, determine the target current value based on the selected control mode and the driving amount of the actuator performing within the hysteresis area associated with the predetermined target driving amount.

2. The control device according to claim 1, wherein the processor is configured to set the target current value based on: (i) the control mode and (ii) one of either a lower limit, an upper limit, or an intermediate value of the hysteresis area.

3. The control device according to claim 1, wherein:
 the plurality of control modes includes:
  a first mode in which a variation of a driving amount of the actuator is suppressed,
  a second mode in which power consumption of the actuator is suppressed, and
  a third mode in which a responsiveness of the actuator is higher than the responsiveness of the actuator in the first mode and second mode when the driving amount of the actuator is changed, and
 the processor is configured to select the control mode from the plurality of control modes based on the state of the apparatus in which the actuator is disposed.

4. The control device according to claim 3, wherein:
 the apparatus in which the actuator is disposed is an engine of a vehicle,
 the actuator is a linear solenoid disposed in an exhaust gas recirculation (EGR) valve configured to adjust an amount of exhaust gas flowing into a suction side of the EGR valve from an exhaust side of the EGR valve, and
 the processor is configured to select the control mode from the plurality of control modes based on a rotation speed and a load factor of the engine.

5. The control device according to claim 1, wherein the processor is configured to learn the hysteresis area based on the driving current and the driving amount of the actuator.

6. A control method of controlling an actuator having a hysteresis area, the control method comprising:
 storing information of a hysteresis area of the actuator, the hysteresis area being a performance region of the actuator within which a driving amount of the actuator is maintained at a predetermined target driving amount of the actuator and a driving current supplied to the actuator is changed;

selecting a control mode from among a plurality of control modes based on a state of an apparatus in which the actuator is disposed;

determining a value of the driving current based on a target current value such that the driving amount of the actuator corresponds to the predetermined target driving amount; and supplying the determined driving current according to the target current value to the actuator based on the control mode while maintaining the driving amount of the actuator at the predetermined target driving amount, wherein:

upon determining that the driving amount of the actuator equals the predetermined target driving amount based on a detected driving amount detected by a sensor, determining the target current value based on the selected control mode and the driving amount of the actuator performing within the hysteresis area associated with the predetermined target driving amount.

\* \* \* \* \*